(12) United States Patent
Bhasin et al.

(10) Patent No.: US 12,555,105 B2
(45) Date of Patent: Feb. 17, 2026

(54) SYSTEM AND METHOD FOR REVOCABLE PEER-TO-PEER PAYMENTS

(71) Applicant: Visa International Service Association, San Francisco, CA (US)

(72) Inventors: Gurpreet Singh Bhasin, Fremont, CA (US); Saswat Kumar Nayak, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 73 days.

(21) Appl. No.: 17/794,311

(22) PCT Filed: Jan. 22, 2020

(86) PCT No.: PCT/US2020/014564
§ 371 (c)(1),
(2) Date: Jul. 21, 2022

(87) PCT Pub. No.: WO2021/150218
PCT Pub. Date: Jul. 29, 2021

(65) Prior Publication Data
US 2023/0108839 A1    Apr. 6, 2023

(51) Int. Cl.
*G06Q 20/38*    (2012.01)
*G06Q 20/22*    (2012.01)

(52) U.S. Cl.
CPC ....... *G06Q 20/3829* (2013.01); *G06Q 20/223* (2013.01); *G06Q 2220/00* (2013.01)

(58) Field of Classification Search
CPC ............. G06Q 20/3829; G06Q 20/223; G06Q 2220/00; G06Q 20/385; G06Q 20/401;
(Continued)

(56) References Cited

U.S. PATENT DOCUMENTS 8,898,762 B2    11/2014 Kang
11,354,660 B1 *    6/2022 Griffin ............. G06Q 20/38215
(Continued)

FOREIGN PATENT DOCUMENTS

CN    101848087 A  *  9/2010
CN    105323223 A     2/2016
(Continued)

OTHER PUBLICATIONS

Sultan et al., "Secure Protocol for Financial Transactions Using Smartphones—SPFT Formally Proved by AVISPA", 11th International Conference on Security and Cryptography, Aug. 28, 2014, pp. 1-6.

*Primary Examiner* — Chunling Ding
(74) *Attorney, Agent, or Firm* — The Webb Law Firm

(57) ABSTRACT

A method, system, and computer program product is provided for revocable peer-to-peer payments. The method includes generating an asymmetric key pair comprising a first key and a second key, encrypting at least a portion of the peer-to-peer payment data with the first key to generate encrypted payment data, storing the encrypted payment data, communicating the second key to a first device associated with the first user, receiving the second key from a second device associated with the second user, decrypting the encrypted payment data based on the second key received from the second device, and processing the payment from the first account to the second account based on decrypting the encrypted payment data.

12 Claims, 4 Drawing Sheets

(58) Field of Classification Search
CPC ...... G06Q 20/02; G06Q 20/10; G06Q 20/405; G06Q 20/407; H04L 2209/56; H04L 9/0825; H04L 67/104

See application file for complete search history.

(56) References Cited

U.S. PATENT DOCUMENTS

| | | | |
|---|---|---|---|
| 11,587,056 B2* | 2/2023 | Xiu | G06Q 20/403 |
| 11,956,347 B2* | 4/2024 | Kim | H04L 9/0869 |
| 2005/0182710 A1 | 8/2005 | Andersson et al. | |
| 2006/0163341 A1 | 7/2006 | Tulluri et al. | |
| 2009/0070263 A1 | 3/2009 | Davis et al. | |
| 2012/0231844 A1 | 9/2012 | Coppinger | |
| 2013/0254052 A1 | 9/2013 | Royyuru et al. | |
| 2013/0275308 A1 | 10/2013 | Paraskeva et al. | |
| 2014/0337235 A1* | 11/2014 | Van Heerden | G06Q 20/223 705/71 |
| 2015/0180839 A1 | 6/2015 | Moffat | |
| 2015/0371224 A1* | 12/2015 | Lingappa | G06Q 20/3829 705/71 |
| 2016/0019542 A1 | 1/2016 | Eischen | |
| 2016/0086175 A1 | 3/2016 | Finlow-Bates et al. | |
| 2016/0092696 A1 | 3/2016 | Guglani et al. | |
| 2016/0358163 A1 | 12/2016 | Kumar et al. | |
| 2017/0111170 A1 | 4/2017 | Baghdasaryan | |
| 2017/0124562 A1 | 5/2017 | Hessler | |
| 2017/0193499 A1* | 7/2017 | Kusnanto | H04L 63/18 |
| 2018/0349901 A1 | 12/2018 | Chen et al. | |
| 2020/0013028 A1 | 1/2020 | Black et al. | |
| 2021/0012325 A1* | 1/2021 | Harish | G06Q 20/38215 |
| 2021/0035094 A1* | 2/2021 | Ozaki | G06Q 20/4016 |
| 2021/0218566 A1* | 7/2021 | Mastenbrook | H04L 9/3271 |

FOREIGN PATENT DOCUMENTS

| | | | | |
|---|---|---|---|---|
| CN | 109102270 A | * | 12/2018 | ......... G06Q 20/4016 |
| CN | 110245948 A | * | 9/2019 | ............. G06Q 40/04 |
| DE | 102018005037 A1 | | 1/2020 | |
| KR | 101544722 B1 | | 8/2015 | |
| KR | 1020160052015 A | | 5/2016 | |
| KR | 1020170092909 A | | 8/2017 | |
| WO | WO-2015157403 A1 | * | 10/2015 | ............... H04L 9/14 |
| WO | 2019092046 A1 | | 5/2019 | |

* cited by examiner

SYSTEM AND METHOD FOR REVOCABLE PEER-TO-PEER PAYMENTS

CROSS-REFERENCE TO RELATED APPLICATION

This application is the United States national phase of International Application No. PCT/US2020/014564 filed Jan. 22, 2020, the entire disclosure of which is hereby incorporated by reference in its entirety.

BACKGROUND

1. Technical Field

This disclosure relates generally to payments between users and, in non-limiting embodiments or aspects, systems, methods, and computer program products for revocable peer-to-peer payments.

2. Technical Considerations

Users wishing to send payments to other users may do so using direct payments through, for example, their respective banks. However, once such a payment is made it cannot be revoked by the payor. This, even if the payee user is not present to accept the payment, the payment is transferred to an account of the payee and cannot be recovered by the payor.

SUMMARY

According to non-limiting embodiments or aspects, provided is a computer-implemented method, comprising: receiving, with at least one processor, peer-to-peer payment data for a payment to be made from a first account associated with a first user to a second account associated with a second user, the peer-to-peer payment data comprising a payment amount; generating, with at least one processor, an asymmetric key pair comprising a first key and a second key; encrypting, with at least one processor, at least a portion of the peer-to-peer payment data with the first key to generate encrypted payment data; storing, with at least one processor, the encrypted payment data; communicating, with at least one processor, the second key to a first device associated with the first user; receiving, with at least one processor, the second key from a second device associated with the second user; decrypting, with at least one processor, the encrypted payment data based on the second key received from the second device; and processing the payment from the first account to the second account based on decrypting the encrypted payment data.

In non-limiting embodiments or aspects, the computer-implemented method further comprises: automatically transmitting the second key from the first device to the second device in response to input from the first user. In non-limiting embodiments or aspects, the computer-implemented method further comprises: automatically transmitting the second key from the first device to the second device in response to determining at least one rule has been satisfied. In non-limiting embodiments or aspects, the computer-implemented method further comprises generating, with at least one processor, a payment token based on the peer-to-peer payment data. In non-limiting embodiments or aspects, the payment token comprises the encrypted payment data. In non-limiting embodiments or aspects, the encrypted payment data comprises an encrypted value of a payment amount. In non-limiting embodiments or aspects, the payment token comprises a unique identifier, an identifier associated with the second user, and the encrypted payment data, wherein the encrypted payment data comprises an encrypted value of a payment amount. In non-limiting embodiments or aspects, the computer-implemented method further comprises: communicating, with at least one processor, at least a portion of the peer-to-peer payment data to a first issuer system associated with the first account. In non-limiting embodiments or aspects, at least one processor of a payment system arranged remotely from the first device, the second device, and the first issuer system generates the asymmetric key pair, encrypts the at least a portion of the peer-to-peer payment data, and communicates the second key to the first device.

According to non-limiting embodiments or aspects, provided is a system for revocable peer-to-peer payments, comprising at least one processor programmed or configured to: receive peer-to-peer payment data for a payment to be made from a first account associated with a first user to a second account associated with a second user, the peer-to-peer payment data comprising a payment amount; generate an asymmetric key pair comprising a first key and a second key; encrypt at least a portion of the peer-to-peer payment data with the first key to generate encrypted payment data; store the encrypted payment data; communicate the second key to a first device associated with the first user; receive the second key from a second device associated with the second user; decrypt the encrypted payment data based on the second key received from the second device; and process the payment from the first account to the second account based on decrypting the encrypted payment data.

In non-limiting embodiments or aspects, the at least one processor is further programmed or configured to automatically transmit the second key from the first device to the second device in response to input from the first user. In non-limiting embodiments or aspects, the at least one processor is further programmed or configured to automatically transmit the second key from the first device to the second device in response to determining at least one rule has been satisfied. In non-limiting embodiments or aspects, the at least one processor is further programmed or configured to generate a payment token based on the peer-to-peer payment data. In non-limiting embodiments or aspects, the payment token comprises the encrypted payment data. In non-limiting embodiments or aspects, the encrypted payment data comprises an encrypted value of a payment amount. In non-limiting embodiments or aspects, the payment token comprises a unique identifier, an identifier associated with the second user, and the encrypted payment data, wherein the encrypted payment data comprises an encrypted value of a payment amount. In non-limiting embodiments or aspects, the at least one processor is further programmed or configured to communicate at least a portion of the peer-to-peer payment data to a first issuer system associated with the first account. In non-limiting embodiments or aspects, the at least one processor is further programmed or configured to automatically transmit the second key from the first device to the second device in response to input from the first user.

According to non-limiting embodiments or aspects, provided is a computer program product for revocable peer-to-peer payments, comprising at least one non-transitory computer-readable medium including program instructions that, when executed by at least one processor, cause the at least one processor to: receive peer-to-peer payment data for a payment to be made from a first account associated with a first user to a second account associated with a second user, the peer-to-peer payment data comprising a payment amount; generate an asymmetric key pair comprising a first key and a second key; encrypt at least a portion of the peer-to-peer payment data with the first key to generate encrypted payment data; store the encrypted payment data; communicate the second key to a first device associated with the first user; receive the second key from a second device associated with the second user; decrypt the encrypted payment data based on the second key received from the second device; and process the payment from the first account to the second account based on decrypting the encrypted payment data. In non-limiting embodiments or aspects, the program instructions, when executed by the at least one processor, further cause the at least one processor to generate a payment token based on the peer-to-peer payment data.

Other non-limiting embodiments or aspects will be set forth in the following numbered clauses:

Clause 1: A computer-implemented method, comprising: receiving, with at least one processor, peer-to-peer payment data for a payment to be made from a first account associated with a first user to a second account associated with a second user, the peer-to-peer payment data comprising a payment amount; generating, with at least one processor, an asymmetric key pair comprising a first key and a second key; encrypting, with at least one processor, at least a portion of the peer-to-peer payment data with the first key to generate encrypted payment data; storing, with at least one processor, the encrypted payment data; communicating, with at least one processor, the second key to a first device associated with the first user; receiving, with at least one processor, the second key from a second device associated with the second user; decrypting, with at least one processor, the encrypted payment data based on the second key received from the second device; and processing the payment from the first account to the second account based on decrypting the encrypted payment data.

Clause 2: The computer-implemented method of clause 1, further comprising: automatically transmitting the second key from the first device to the second device in response to input from the first user.

Clause 3: The computer-implemented method of clauses 1 or 2, further comprising: automatically transmitting the second key from the first device to the second device in response to determining at least one rule has been satisfied.

Clause 4: The computer-implemented method of any of clauses 1-3, further comprising generating, with at least one processor, a payment token based on the peer-to-peer payment data.

Clause 5: The computer-implemented method of any of clauses 1-4, wherein the payment token comprises the encrypted payment data.

Clause 6: The computer-implemented method of any of clauses 1-5, wherein the encrypted payment data comprises an encrypted value of a payment amount.

Clause 7: The computer-implemented method of any of clauses 1-6, wherein the payment token comprises a unique identifier, an identifier associated with the second user, and the encrypted payment data, wherein the encrypted payment data comprises an encrypted value of a payment amount.

Clause 8: The computer-implemented method of any of clauses 1-7, further comprising: communicating, with at least one processor, at least a portion of the peer-to-peer payment data to a first issuer system associated with the first account.

Clause 9: The computer-implemented method of any of clauses 1-8, wherein at least one processor of a payment system arranged remotely from the first device, the second device, and the first issuer system generates the asymmetric key pair, encrypts the at least a portion of the peer-to-peer payment data, and communicates the second key to the first device.

Clause 10: A system for revocable peer-to-peer payments, comprising at least one processor programmed or configured to: receive peer-to-peer payment data for a payment to be made from a first account associated with a first user to a second account associated with a second user, the peer-to-peer payment data comprising a payment amount; generate an asymmetric key pair comprising a first key and a second key; encrypt at least a portion of the peer-to-peer payment data with the first key to generate encrypted payment data; store the encrypted payment data; communicate the second key to a first device associated with the first user; receive the second key from a second device associated with the second user; decrypt the encrypted payment data based on the second key received from the second device; and process the payment from the first account to the second account based on decrypting the encrypted payment data.

Clause 11: The system of clause 10, wherein the at least one processor is further programmed or configured to automatically transmit the second key from the first device to the second device in response to input from the first user.

Clause 12: The system of clauses 10 or 11, wherein the at least one processor is further programmed or configured to automatically transmit the second key from the first device to the second device in response to determining at least one rule has been satisfied.

Clause 13: The system of any of clauses 10-12, wherein the at least one processor is further programmed or configured to generate a payment token based on the peer-to-peer payment data.

Clause 14: The system of any of clauses 10-13, wherein the payment token comprises the encrypted payment data.

Clause 15: The system of any of clauses 10-14, wherein the encrypted payment data comprises an encrypted value of a payment amount.

Clause 16: The system of any of clauses 10-15, wherein the payment token comprises a unique identifier, an identifier associated with the second user, and the encrypted payment data, wherein the encrypted payment data comprises an encrypted value of a payment amount.

Clause 17: The system of any of clauses 10-16, wherein the at least one processor is further programmed or configured to communicate at least a portion of the peer-to-peer payment data to a first issuer system associated with the first account.

Clause 18: The system of any of clauses 10-17, wherein the at least one processor is further programmed or configured to automatically transmit the second key from the first device to the second device in response to input from the first user.

Clause 19: A computer program product for revocable peer-to-peer payments, comprising at least one non-transitory computer-readable medium including program instructions that, when executed by at least one processor, cause the at least one processor to: receive peer-to-peer payment data for a payment to be made from a first account associated with a first user to a second account associated with a second user, the peer-to-peer payment data comprising a payment amount; generate an asymmetric key pair comprising a first key and a second key; encrypt at least a portion of the peer-to-peer payment data with the first key to generate encrypted payment data; store the encrypted payment data; communicate the second key to a first device associated with the first user; receive the second key from a second device associated with the second user; decrypt the encrypted payment data based on the second key received from the second device; and process the payment from the first account to the second account based on decrypting the encrypted payment data.

Clause 20: The computer program product of clause 19, wherein the program instructions, when executed by the at least one processor, further cause the at least one processor to generate a payment token based on the peer-to-peer payment data.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments that are illustrated in the accompanying figures, in which.

DESCRIPTION OF THE PREFERRED EMBODIMENTS

Figure 1:
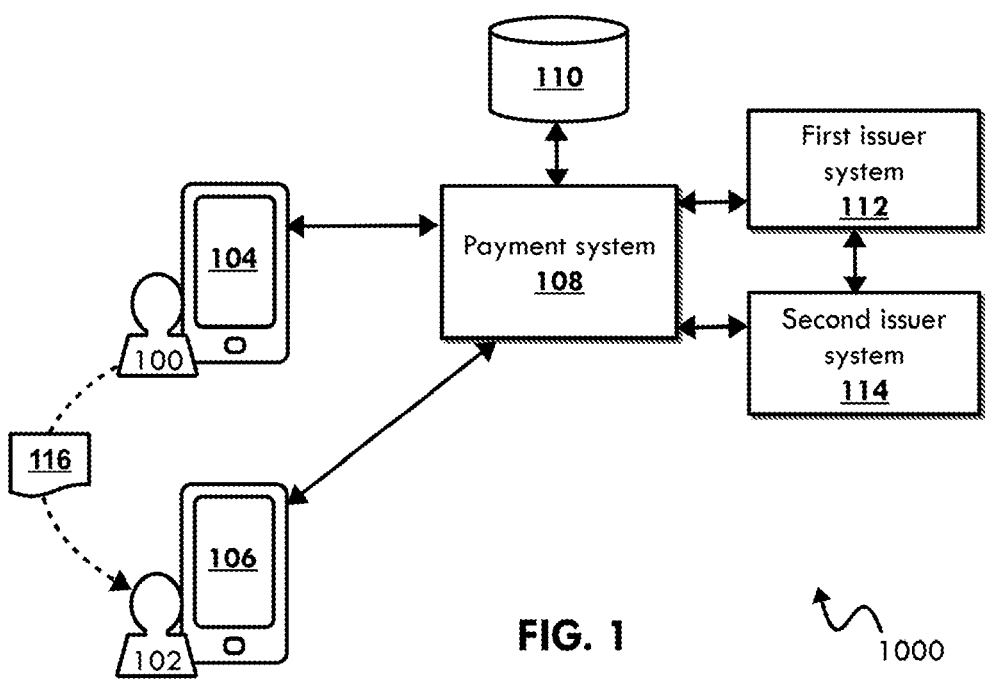
FIG. 1 is a schematic diagram of a system for revocable peer-to-peer payments according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "graphical user interface" (GUI) refers to a generated display, such as one or more displays with which a user may interact, either directly or indirectly (e.g., through a keyboard, mouse, touchscreen, etc.).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments or aspects, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

Non-limiting embodiments are directed to a revocable and verifiable peer-to-peer payment system and method that enables users to make payments to other individuals in a secure and effective manner. In non-limiting embodiments or aspects, the use of cryptography to secure a portion of a payment token enables the payment token to be held by an issuer system until bring provided with a decryption key, thereby enabling for a delay between the initiation of the payment request and the processing of the payment. The disclosed infrastructure and flow of data between a payment system, a first user device (e.g., of the payor), a second user device (e.g., of the payee) and issuer systems (for accounts of both the payor and payee) enable for an improved peer-to-peer payment system that that avoids the extra computational resources associated with disputes, chargeback or reversal attempts, or the like.

FIG. 1 depicts a system 1000 for revocable peer-to-peer payments according to a non-limiting embodiment. The system 1000 includes a payment system 108 in communication with a first issuer system 112 and a second issuer system 114. The payment system 108 is also in communication with a plurality of user devices through one or more network environments, such as the Internet. In the depicted example, the payment system 108 is in communication with a first user device 104 operated by a first user 100 and a second user device 106 operated by a second user 102. The payment system 108 may include one or more computing devices such as, for example, a server computer. The payment system 108 may also include one or more components of an electronic payment network, such as a payment gateway and/or transaction processing system associated with a transaction service provider. In some examples, the payment system 108 may be used to conduct a variety of different payment types. In some examples, the payment system 108 may be dedicated to conducting peer-to-peer payments among users. It will be appreciated that other variations are possible.

With continued reference to FIG. 1, in the depicted example, the first user 100 (e.g., a payor) seeks to make a payment to the second user 102 (e.g., a payee). To do so, the first user 100 operates the first user device 104 and the first user device 104 generates a payment request message for communication to the payment system 108. The payment request message may identify the first user 100, an account associated with the first user 100 (e.g., an account identifier, a token, or the like), the second user 102, an account associated with the second user 102 (e.g., an account identifier, a token, or the like), a payment amount, and/or other information. As an example, the payment request message may include a user identifier (e.g., a recipient handle) for the second user. The first user device 104 and/or second user device 106 may include one or more software applications configured to facilitate interaction with the users 100, 102 to effectuate the sending and receiving of payments. The software applications may display one or more GUIs on the devices 104, 106 for facilitating user interaction. The applications may be dedicated payment applications, banking applications, web browsers, components of operating systems, and/or the like.

Still referring to FIG. 1, in non-limiting embodiments or aspects, the payment request message is processed by the payment system 108. For example, the payment system 108 may communicate with a first issuer system 112 corresponding to an account of the first user 100 identified in the payment request message to determine that sufficient funds are available. The payment system 108 may generate a key that is usable to complete the payment being requested. For example, the payment system 108 may generate a key value and use the key value to encrypt the payment request message and/or payment data derived therefrom. For example, the payment system 108 may generate and encrypt a payment token. The payment system 108 may communicate the key to the first user device 104. When the first user 100 chooses, the first user 100 may communicate a key 116 to the second user 102. This communication may be out-of-band (e.g., outside of the payment processing network). For example, the first user 100 may physically hand the key 116 to the second user 102, the first user 100 may email or text message the key 116 to the second user device 106, the first user 100 may operate an application on the first user device 104 to communicate the key 116 through a corresponding application on the second user device 106, and/or the like.

In non-limiting embodiments or aspects, the payment system 108 generates a payment token that is valid for a single use (e.g., a one-time use token) based on the user identifier of the second user 102, a unique identifier (e.g., a one-time code that is unique to the payment request), and an encrypted payment amount value (and/or some other portion of payment data). The encrypted value may be generated using a key from a pair of keys (e.g., a public or private key of a public/private key pair). For example, the payment amount value may be encrypted with a public key of a public/private key pair. In non-limiting embodiments or aspects, the key used to encrypt the payment amount value corresponds with the key 116 passed from the first user 100 to the second user 102 to unlock the payment. As an example, the payment amount value may be encrypted with a public key corresponding to a private key 116 used to unlock the payment. In non-limiting embodiments or aspects, the payment token may include a data structure including the user identifier, the unique identifier, and an encrypted payment amount value.

In non-limiting embodiments or aspects, the payment system 108 may generate an asymmetric key pair for each payment request. In other non-limiting embodiments or aspects, a key pair may be established previous to the payment request message being communicated and may be assigned the first user 100 and/or first user device 104. It will be appreciated that the payment token or some portion thereof (e.g., the payment amount value) may be encrypted with either key of an asymmetric key pair. In other non-limiting embodiments or aspects, a symmetric key may also be used.

Still referring to FIG. 1, the second user 102 may request that the payment is completed by communicating a payment completion message to the payment system 108 that includes the key 116. As an example, the second user 102 may input the key 116 into a webpage, software application, and/or the like to communicate the key 116 to the payment system 108. In this manner, the first user 100 can change his or her mind about making the payment until communicating the key 116 to the second user 102. Thus, even though the payment has been initiated and approved by the first issuer system 112, the first user 100 may revoke the payment by not providing the key 116 to the second user 102. In some examples, the key 116 may expire after a predetermined time period such that, if the first user 100 does not provide the key 116 to the second user 102 and/or the second user 102 does not provide the key 116 to the payment system 108 within the predetermined time period, the payment is cancelled and cannot be completed by the second user 102.

Moreover, even after the key 116 is communicated to the second user 102, the first user 100 may still revoke the payment prior to the second user 102 completing the payment. For example, the first user 100 may communicate the key 116 to the second user and later decide to revoke the payment. If the second user 102 has not completed the payment by communicating the key 116 to the payment system 108 to request payment completion, the first user 100 may operate the first user device 104 to communicate a cancel payment message to the payment system 108. The cancel payment message may identify the original payment request message and may include the key 116 or some other key previously communicated to the first user device 104 by the payment system 108. In response to receiving the cancel payment message, the payment system 108 may cancel the payment such that it is no longer receivable by the second user 102, even if the second user 102 has the key 116.

Still referring to FIG. 1, the first issuer system 112 may communicate payment data to the second issuer system 114 at any point. For example, after the payment system 108 initially communicates with the first issuer system 112 (e.g., to authorize the payment or the like), the first issuer system 112 may communicate at least a portion of the payment request message or the data contained therein to the second issuer system 114. For example, the first issuer system 112 may communicate a user identifier for the second user 102 to the second issuer system 114. In response to receiving the user identifier and/or other payment data from the first issuer system 112, the second issuer system 114 may generate or request the generation of a challenge to communicate to the second user device 106 either directly, through the payment system 108, or through some other channel. For example, the challenge may include data encrypted with a public key corresponding to a private key 116 passed from the first user 100 to the second user 102. In non-limiting embodiments or aspects, the second issuer system 114 may communicate a challenge request message to the payment system 108 which, in response to receiving the challenge request message, generates and communicates a challenge to the second user device 106. In other non-limiting embodiments or aspects, the payment system 108 may communicate the challenge to the second user device 106 without being requested by the second issuer system 114.

Figure 2:
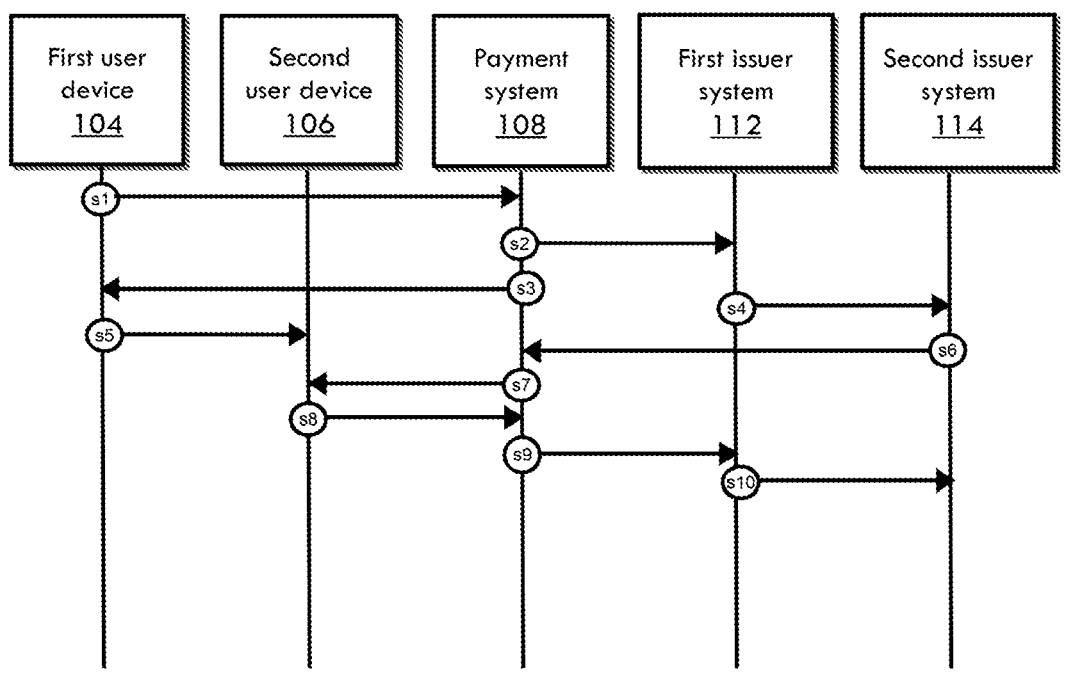
FIG. 2 is a sequence diagram of a system for revocable peer-to-peer payments according to a non-limiting embodiment.

With reference to FIG. 2, a sequence diagram is shown according to a non-limiting embodiment. It will be appreciated that the sequence shown in FIG. 2 is for example purposes only and that variations are possible, including additional steps, a different order of steps, alternative steps, and/or the like. At step 1 of FIG. 2, a first user device 104 communicates a payment request message to a payment system 108. This message may be the first communication during the initiation of a payment or, in other examples, may be in response to a payment request initiated by the payment system 108 and/or a second user device 106. The payment request message may specify a payment amount, a user identifier associated with a second user to which a payment is to be made, an account of a first user from which the payment is to be made, and/or other information.

At step 2 of FIG. 2, the payment system 108 generates a payment token and communicates it to a first issuer system 112 associated with the account of the first user from which the payment is to be made. The payment token may include, for example, information about the second user (e.g., payee) such as a unique identifier associated with the second user, a unique identifier associated with the payment (e.g., a one-time code), and an encrypted payment amount value. The payment amount value may be encrypted with one key of an asymmetric key pair that is stored and/or accessed by the payment system 108. It will be appreciated that, in some non-limiting embodiments or aspects, in addition or alternatively to encrypting the payment amount value, the entire token may be encrypted and/or other portions of the token may be encrypted. In some non-limiting examples, the key pair may be used for a single payment transaction and may be generated by the payment system 108 for each payment request message.

At step 3 of FIG. 2, the payment system 108 communicates an unlock key to the first user device 104. The unlock key may be a key of the key pair that corresponds to the key used to encrypt the payment amount value. At step 4 of FIG. 2, the first issuer system 112 identifies the second issuer system 114 associated with an account of the second user and communicates the payment token or a portion thereof. For example, the first issuer system 112 may communicate the unique identifier associated with the second user and the unique identifier associated with the payment transaction. At step 5 of FIG. 2, the first user device 104 communicates the unlock key to the second user device 106. It will be appreciated that the unlock key may also be communicated in any other manner to a second user and input by the second user into the second user device 106 and/or payment system 108.

At step 6 of FIG. 2, the second issuer system 114 requests that the payment system 108 communicate a challenge to the second user device 104. The second issuer system 114 may, for example, communicate the unique identifier associated with the second user to the payment system 108 to initiate the challenge. In other examples, the payment system 108 and/or second user may initiate the challenge. At step 7 of FIG. 2, the payment system 108 communicates a challenge to the second user device 106. The challenge may, for example, prompt the second user through the second user device 106 to input the unlock key. At step 8 of FIG. 2, the second user device 106 communicates the unlock key to the payment system 108. It will be appreciated that, in some non-limiting embodiments or aspects, the unlock key may be communicated from the second user device 106 to the first issuer system 112. At step 9 of FIG. 2, the payment system 108 communicates the unlock key to the first issuer system 114. As mentioned above, in some non-limiting embodiments or aspects, the unlock key may be communicated from the second user device 106 to the first issuer system 112. At step 10 of FIG. 2, the first issuer system 112 uses the unlock key to decrypt the payment token or portion thereof (e.g., the payment amount value) and processes the payment in order to transmit the payment amount to the second issuer system 114 from the account of the first user. The payment may be effectuated between issuer systems in various ways.

Figure 3:
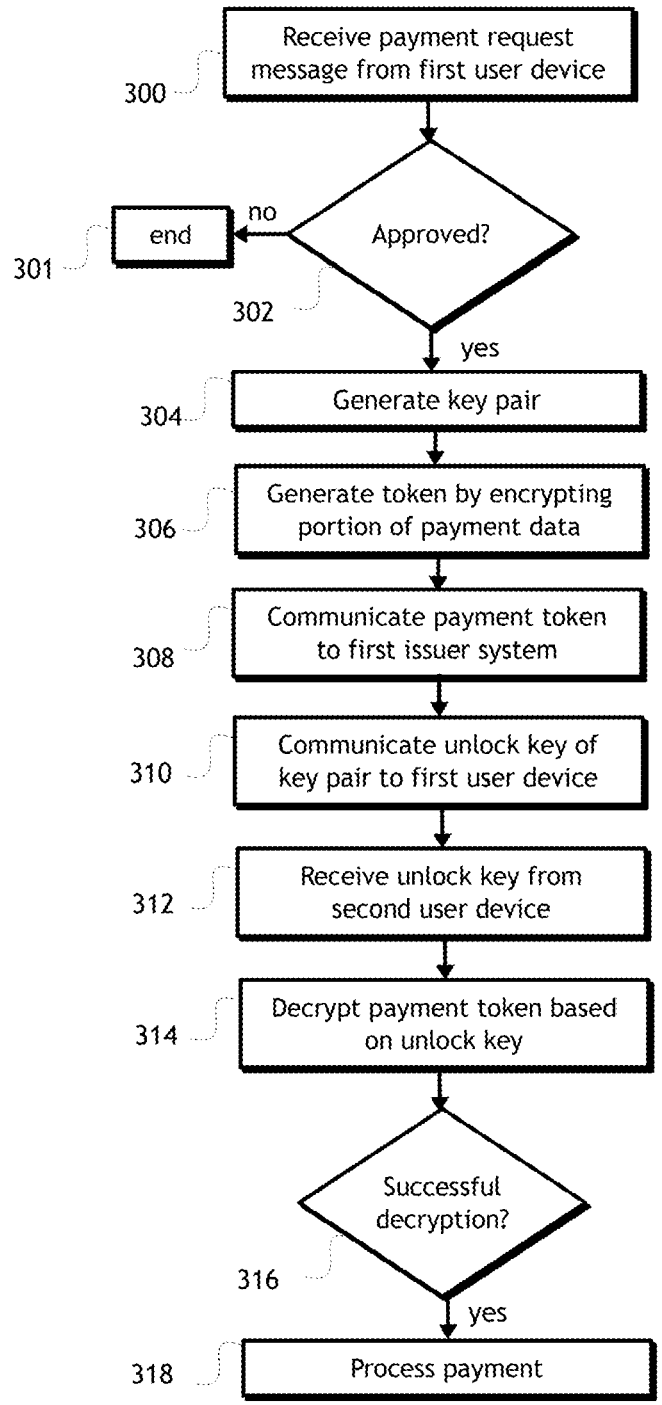
FIG. 3 is a flow diagram for a method for revocable peer-to-peer payments according to a non-limiting embodiment.

With reference to FIG. 3, a flow diagram is shown according to a non-limiting embodiment. It will be appreciated that, in non-limiting embodiments or aspects, additional, fewer, different, and/or a different order of steps may be used than the example shown in FIG. 3. At step 300 a payment request message is received from a first user device. At step 302, the payment system determines whether the payment request message is approved. For example, it may be determined if the first user (payor) has sufficient funds to make the payment to a second user (payee). If the request is not approved, the method may end at step 301. If the request is approved, the method may proceed to step 304 and a key pair may be generated for the transaction. A unique identifier for the transaction may also be generated at step 304. At step 306, a payment token is generated based on a key of the key pair generated in step 304 and payment data associated with the payment request received at step 300. For example, the token or a portion thereof may be encrypted with a key of the key pair.

With continued reference to FIG. 3, the payment token or a portion thereof (e.g., a unique identifier associated with the payee) is communicated to a first issuer system associated with an account of the payor at step 308. At step 310, an unlock key of the key pair that can be used to decrypt the token or portion thereof is communicated to the device of the payor. The payor may then communicate the unlock key out-of-band to the payee through any communication channel or mechanism. At step 312, the unlock key is received from a second user device associated with the payee after the payee receives the same from the payor. The unlock key may be received in response to a challenge as described herein. At step 314, the payment token or portion thereof is decrypted with the unlock key. The payment system or the issuer system associated with the payor's account may perform the decryption. At step 316, it is determined whether the decryption was successful (e.g., whether the unlock key is valid). If the unlock key was valid and the token is decrypted, the payment is processed at step 318.

Figure 4:
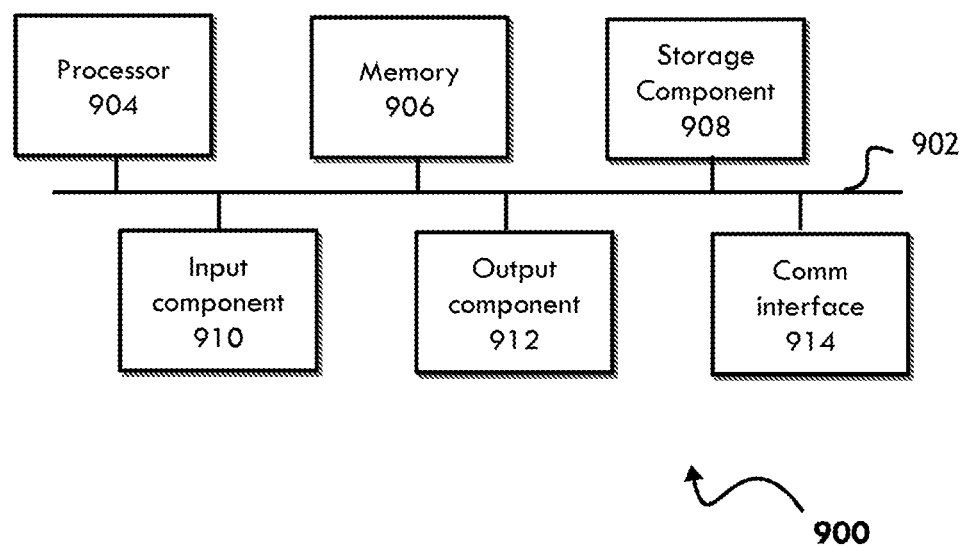
FIG. 4 illustrates example components of a device used in connection with non-limiting embodiments.

Referring now to FIG. 4, shown is a diagram of example components of a device 900 according to non-limiting embodiments. Device 900 may correspond to the user device 104, second user device 106, payment system 108, first issuer system 112, and/or second issuer system 114 in FIG. 1, as an example. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 1. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method, comprising:
   receiving, by at least one processor of a payment system arranged remotely from a first device operated by a first user and a second device operated by a second user, a payment request from the first device, the payment request comprising peer-to-peer payment data for a payment to be made from a first account associated with the first user to a second account associated with the second user, the peer-to-peer payment data comprising a payment amount and a user identifier of the second user;
   generating, by the at least one processor, an asymmetric key pair comprising a first key and a second key;
   generating, by the at least one processor, a token based on the payment amount and the user identifier of the second user;
   encrypting, by the at least one processor, the token with the first key to generate an encrypted token;
   storing the encrypted token;
   communicating, by the at least one processor, the second key to the first device associated with the first user, wherein the at least one processor does not directly transmit the second key to the second device associated with the second user;
   automatically transmitting the second key from the first device to the second device in response to input from the first user or in response to determining that at least one rule has been satisfied;
   transmitting a challenge to the second device associated with the second user based on receiving the challenge or a request for the challenge from a second issuer system associated with the second account;
   receiving, by the at least one processor, a payment completion message comprising the second key from the second device associated with the second user;
   decrypting, by the at least one processor, the encrypted token based on the second key received from the second device;
   determining, by the at least one processor, that the second key is received from the second device associated with the second user within a predetermined time period; and
   after determining that the second key is received within the predetermined time period, processing the payment from the first account to the second account based on the decrypting of the encrypted token.

2. The computer-implemented method of claim 1, wherein the token comprises encrypted payment data.

3. The computer-implemented method of claim 1, wherein the encrypted token comprises an encrypted value of the payment amount.

4. The computer-implemented method of claim 1, wherein the token comprises a unique identifier, the user identifier of the second user, and encrypted payment data, wherein the encrypted payment data comprises an encrypted value of the payment amount.

5. The computer-implemented method of claim 1, further comprising:
   communicating, by the at least one processor, at least a portion of the peer-to-peer payment data to a first issuer system associated with the first account.

6. A system for revocable peer-to-peer payments, comprising at least one processor of a payment system arranged remotely from a first device operated by a first user and a second device operated by a second user, the at least one processor programmed or configured to:
   receive peer-to-peer payment data for a payment to be made from a first account associated with the first user to a second account associated with the second user, a payment request from the first device, the payment request comprising the peer-to-peer payment data comprising a payment amount and a user identifier of the second user;
   generate an asymmetric key pair comprising a first key and a second key;
   generate a token based on the payment amount and the user identifier of the second user;
   encrypt the token with the first key to generate an encrypted token;
   store the encrypted token;
   communicate the second key to the first device associated with the first user, wherein the at least one processor does not directly transmit the second key to the second device associated with the second user;
   automatically transmit the second key from the first device to the second device in response to input from the first user or in response to determining that at least one rule has been satisfied;
   transmit a challenge to the second device associated with the second user based on receiving the challenge or a request for the challenge from a second issuer system associated with the second account;
   receive a payment completion message comprising the second key from the second device associated with the second user;
   decrypt the encrypted token based on the second key received from the second device;
   determine that the second key is received from the second device associated with the second user within a predetermined time period; and
   after determining that the second key is received within the predetermined time period, process the payment from the first account to the second account based on the decrypting of the encrypted token.

7. The system of claim 6, wherein the token comprises encrypted payment data.

8. The system of claim 6, wherein the encrypted token comprises an encrypted value of the payment amount.

9. The system of claim 6, wherein the token comprises a unique identifier, the user identifier of the second user, and encrypted payment data, wherein the encrypted payment data comprises an encrypted value of the payment amount.

10. The system of claim 6, wherein the at least one processor is further programmed or configured to communicate at least a portion of the peer-to-peer payment data to a first issuer system associated with the first account.

11. The system of claim 6, wherein the payment system comprises at least one of a transaction processing system or payment gateway.

12. A computer program product for revocable peer-to-peer payments, comprising at least one non-transitory computer-readable medium including program instructions that, when executed by at least one processor of a payment system arranged remotely from a first device operated by a first user and a second device operated by a second user, cause the at least one processor to:

receive peer-to-peer payment data for a payment to be made from a first account associated with the first user to a second account associated with the second user, a payment request from the first device, the payment request comprising the peer-to-peer payment data comprising a payment amount and a user identifier of the second user;

generate an asymmetric key pair comprising a first key and a second key;

generate a token based on the payment amount and the user identifier of the second user;

encrypt the token with the first key to generate an encrypted token;

store the encrypted token;

communicate the second key to the first device associated with the first user, wherein the at least one processor does not transmit the second key to the second device associated with the second user;

automatically transmit the second key from the first device to the second device in response to input from the first user or in response to determining that at least one rule has been satisfied;

transmit a challenge to the second device associated with the second user based on receiving the challenge or a request for the challenge from a second issuer system associated with the second account;

receive a payment completion message comprising the second key from the second device associated with the second user;

decrypt the encrypted token based on the second key received from the second device;

determine that the second key is received from the second device associated with the second user within a predetermined time period; and after determining that the second key is received within the predetermined time period, process the payment from the first account to the second account based on the decrypting of the encrypted token.

\* \* \* \* \*